(12) United States Patent
Dixon et al.

(10) Patent No.: US 6,594,427 B1
(45) Date of Patent: Jul. 15, 2003

(54) COMMUNICATION CABLE HAVING POLYPROPYLENE COPOLYMER JACKETING MATERIAL

(75) Inventors: Lisa A. Dixon, Atlanta, GA (US); Richard H. Norris, Powder Springs, GA (US); Richard D. Small, Lilburn, GA (US); Phillip M. Thomas, Suwanee, GA (US); Peter A. Weimann, Atlanta, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/644,489

(22) Filed: Aug. 23, 2000

(51) Int. Cl.[7] .................................................. G02B 6/44
(52) U.S. Cl. ....................................................... 385/109
(58) Field of Search ................................. 385/109, 111, 385/113, 102, 107, 103, 104, 141, 143, 145, 126

(56) References Cited

U.S. PATENT DOCUMENTS

| | | | |
|---|---|---|---|
| 4,078,853 A | 3/1978 | Kempf et al. ............. 350/96.23 |
| 4,125,699 A | 11/1978 | Yamamoto et al. ....... 526/169.2 |
| 4,259,410 A | 3/1981 | Dittman et al. ............. 428/461 |
| 4,730,894 A | 3/1988 | Arroyo .................... 350/96.23 |
| 4,826,278 A | 5/1989 | Gartside, III et al. .... 350/96.23 |
| 4,844,575 A | 7/1989 | Kinard et al. ............ 350/96.23 |
| 4,869,573 A | 9/1989 | Radage et al. ........... 350/96.23 |
| 4,948,669 A | 8/1990 | Rolland ...................... 428/378 |
| 5,082,348 A | 1/1992 | Gartside, III et al. ....... 385/111 |
| 5,109,457 A | 4/1992 | Panusak et al. ............. 385/102 |
| 5,131,064 A | 7/1992 | Arroyo et al. .............. 385/102 |
| 5,180,889 A | 1/1993 | Rogers et al. .............. 174/113 |
| 5,334,421 A * | 8/1994 | McNutt ....................... 427/513 |
| 5,574,816 A | 11/1996 | Yang et al. ................. 385/109 |
| 5,672,640 A | 9/1997 | Brauer ....................... 523/173 |
| 5,734,773 A * | 3/1998 | Teshima et al. ............ 385/126 |
| 5,744,757 A | 4/1998 | Kenny et al. ............... 174/113 |
| 5,761,362 A | 6/1998 | Yang et al. ................. 385/109 |
| 5,838,864 A | 11/1998 | Patel et al. ................. 385/113 |
| 6,258,909 B1 * | 7/2001 | Zaitsev ...................... 526/318.1 |
| 6,421,486 B1 * | 7/2002 | Daneshvar et al. ......... 385/109 |

FOREIGN PATENT DOCUMENTS

JP 405294832 * 11/1993

OTHER PUBLICATIONS

U. S. patent application, by Dixon et al., mailed Jan. 12, 2000, Ser. No. 09/481,186, entitled "Communication Cable Having Reduced Jacket Shrinkage".

* cited by examiner

Primary Examiner—Jean F. Duverne
(74) Attorney, Agent, or Firm—Thomas, Kavden, Horstmeyer & Risley, LLP

(57) ABSTRACT

A jacket for an outside plant communication cable is made from a resin of an impact-modified polypropylene copolymer compounded with UV stabilizers. The resin has the characteristics of low cost, low post-extrusion shrinkage, high melting temperature and increased crush and abrasion resistance. The UV light stabilizers may include UV absorbers, quenchers, and/or hindered amine light stabilizers.

17 Claims, 1 Drawing Sheet

COMMUNICATION CABLE HAVING POLYPROPYLENE COPOLYMER JACKETING MATERIAL

TECHNICAL FIELD

The present invention is generally related to a communication cable and, more particularly, is related to the outer jacket of such cables.

BACKGROUND OF THE INVENTION

Optical fiber cables have been used for many years to transmit information at high rates and very long distances. The transmission media of the optical fiber cable are hair-thin optical fibers protected from external forces and elements by precisely designed and manufactured cable structures. There are several relatively common cable structure families currently being used to protect these hair-thin optical fibers. Such cable structure families include the loose tube, the slotted core and the central core structures.

Optical fibers are relatively delicate compared to previous types of communication media. Typically made of glass, the fibers are not ductile and can be broken or cracked, either of which can destroy or degrade the signal being transmitted. Therefore, optical fibers are housed in rugged cable structures to protect the fibers from mechanical damage caused by heavy loads, sharp impacts or gnawing rodents. The quality of a signal transmitted through an optical fiber is also sensitive to tensile stress. Accordingly, tensile stiffness members are included in each type of optical fiber cable structure to carry the majority of tensile loads.

Plastic jacketing materials are extruded as the final layer of fiber optic cables in a continuous, high-speed sheathing operation. The jacketing helps to protect against mechanical damage of compressive loads or sharp impacts, and also helps to protect from cuts and other abrasions. During manufacture, the plastic jacketing layer is applied directly over the layers of components used to carry tensile loads. Once added, the jacketing plastic couples to the components in contact with it.

Several types of strength members are used in cables, both metallic and dielectric. Heretofore, strength systems used in optical cables have had two primary functions: 1) to carry tensile loads; and 2) to restrict the contraction and expansion of the jacketing plastic. Tensile loads are applied to the cable during installation, e.g., while being pulled into ground conduits, or during service life, e.g., while suspended between telephone poles. Environmental temperature variations during product life can cause the jacketing plastic to expand and contract applying tensile.and axial compressive loads on the strength systems. However, a more significant instance of contraction by the jacketing plastic occurs during manufacture of the cable. Current jacketing materials, including high-density polyethylene and medium-density polyethylene, exhibit post-extrusion shrinkage during cooling that applies compressive axial loads on any adjacent components, e.g., strength members extending axially along the cable. To resist these compressive and the other tensile loads, rigid strength rods, made from steel, epoxy/glass, epoxy/aramid, etc., have been embedded in cable jackets.

In general, metallic components, including wires and armoring tapes, have excellent tensile properties and sufficiently high compressive stiffness so as not to strain significantly under the axial compressive load exerted by the cooling jacket. Alternately, dielectric materials, such as aramid and glass fibers, which provide excellent tensile characteristics, provide little axial compressive resistance in their simplest, and therefore lowest cost forms, e.g., yarns. Because these yarns cannot resist compressive loads, the shrinking jacket buckles these dielectric tensile members as it cools. When the final cable is loaded in tension, the tensile yarns will not support any tensile load until the cable has been elongated to the point where the yarns are straightened. This process leaves the optical fibers vulnerable to tensile loading until the tensile yarns pick up the load. As a result, current dielectric strength members are generally constructed as rigid composite rods made of high modulus and high strength fibers, such as glass or aramids embedded in a hard epoxy matrix. However, these rigid dielectric rods can be very costly, and they, along with the metal wires, make the cable less flexible because their added compressive stiffness leads to higher flexural stiffness.

For example, U.S. Pat. No. 5,131,064 to Arroyo et al., discloses a cable having strength rods and a lightning-protective sheath system comprising a thermal barrier, which are disposed between the core of the cable and its plastic jacket. The thermal barrier comprises a textile of glass yarns that have been woven into a unit and then sandwiched between a pair of tapes, together with a water-blocking material such as a superabsorbent powder or gel. The glass yarns undulate in the longitudinal direction, not only because of their weaving pattern, but also because the tape follows the undulations of a corrugated metallic shield. Such undulations preclude the tape from receiving any portion of the load until the cable has already been elongated. Because the disclosed tape has a very low tensile strength, 420 Newtons per centimeter of width, the cable's tensile strength effectively comes from rigid strength rods that are embedded in the plastic jacket. However, these rods are less flexible than the woven tape, thereby reducing the flexibility of the entire cable. Further, if a pair of rods are used and are positioned diametrically opposite each other on either side of the core, they make the cable inflexible in all but one plane and much more difficult to handle and install.

Another example is U.S. Pat. No. 4,730,894 to Arroyo, which discloses an optical fiber cable that includes a plurality of equally spaced strength members disposed on a carrier tape and held in place by an adhesive. Once a plastic jacket is extruded onto the strength members, they are coupled to the jacket and provide tensile strength to the cable. However, if the strength members are flexible, i.e., they have essentially no compressive strength or stiffness, then they will shrink in the longitudinal direction after the plastic jacket cools and will not be able to receive any portion of the tensile load until the jacket is elongated. This is undesirable because excessive cable elongation can cause the tensile load to be transferred to the optical fibers. On the other hand, as stated previously, increased compressive stiffness correlates to increased flexural stiffness and, therefore, decreased cable flexibility, which makes cables more difficult to handle and to install. However, to protect the valuable optical fibers, cable flexibility generally has been sacrificed in the prior art.

Yet another example, U.S. Pat. No. 5,838,864 to Patel, discloses a cable with a dielectric strength member system that attempts to maximize the flexibility of the cable by using a flexible woven strength tape to carry to majority of the tensile loads. To control post-extrusion shrinkage, two rigid epoxy-fiber rods are embedded in the jacket. diametrically opposite one another, on either side of the core. However, as these rods do not have to carry tensile load, their size is minimized and, therefore, the overall cost of the strength system is reduced. Further, the volume of jacket material required to encase the smaller strength rods is less than for larger rods, further reducing the cost of the overall cable sheath. Still, the strength system is more expensive and complex than is desirable because of the need for two types of strength systems.

Another approach to preventing jacket shrinkage and buckled strength members from making the optical fibers vulnerable to tensile loads is to control the length of the optical fibers relative to that of the sheath components. Fibers can be protected during the elongation of the sheath if they also are not straight when the cable starts to stretch. Accordingly, most fiber optic cables contain excess fiber length relative to the final length of the cable sheath. However, there is a limit as to the amount of excess fiber length that can reasonably be introduced into a cable core without making the cable diameter prohibitively large or inducing optical signal loss by introducing excessive bends or undulations along a length of fiber. Unfortunately, the contraction of standard cable jacket materials can buckle the simple dielectric strength members as much as 1.5%, while acceptable amounts of excess fiber length may be less than 0.5%.

Therefore, since excess fiber length alone cannot be used to compensate for jacket shrinkage, the common default solution to this problem is to use the rigid dielectric strength rods or metallic wires to resist jacket shrinkage. As stated previously, unlike the metallic strength members, the dielectric rods are very costly, even when compared to their base component yarns and filaments, and rigid enough to reduce cable flexibility. If the jacket shrank less, the size and cost of the rods could be reduced, enhancing cable flexibility while still providing the optical fibers with sufficient protection from tensile loads.

Another important issue in the design of fiber optic cables is protection of the cable from compressive loads. A test of compressive strength is required in the Telcordia Technologies GR-20 Generic Specification for outside plant fiber optic cable, as outlined in Section 6.5.5 of the specification. In this test, the cable is subjected to a load of 220 Newtons per centimeter (N/cm) for 1 minute, followed by a load of 110 N/cm for 10 minutes. The cable construction fails this test if the optical loss of the fibers increases significantly during application of the 110 N/cm load.

One method for enhancing the compressive strength of a cable is to increase the modulus of the outer jacket of the cable. There are many materials that have a higher modulus than polyethylene, which is currently used for outside plant fiber optic cable sheaths. However, most higher modulus alternate materials are much higher in cost than polyethylene.

Therefore, there appears to be a fundamental conflict in providing an easy-handling, cost-effective dielectric cable sheath that adequately protects the optical fibers or other transmission media. Known designs for best protecting the optical fibers can make the cable more expensive, stiff, and difficult to handle. Known designs for making the cable flexible either require that the optical fibers have more excess length than is desirable, or expose the optical fibers to tensile loading and possible breakage.

However, if the jacket material had reduced post-extrusion shrinkage, i.e., less, in axial direction the size of the rigid strength components in dielectric cables could be reduced, which would provide the cable with enhanced flexibility. The reduced size of the rigid members also allows a significant reduction in cable cost. If this jacket material had a higher modulus than conventional polyethylene, the cable would also have improved crush and abrasion resistance. Accordingly, what is sought is a cost-effective jacket material with minimal post-extrusion shrinkage, improved crush and abrasion resistance, and greater stability at higher temperatures, while still meeting the demands of ruggedness and flexibility for use in outdoor communication cables.

Polyethylene is presently used for jacketing in outside plant fiber optic cables. Although this material has excellent reliability, it does have some drawbacks such as relatively high cost, and large post-extrusion shrinkage during manufacturing that must be accounted for in the sheath design. Additionally, medium-density and linear low-density grades of polyethylene exhibit a high coefficient of friction that can hinder installation and cause undesirable softening at high temperatures. The softening at high temperatures is particularly undesirable and results in especially difficult installation in hot climates. What is desired, but is heretofore unknown in the art is a cable jacket, without fillers, that is made of a polymer that has a glass transition temperature less than −4° C., is low in cost, stable, and, when compared to polyethylene, exhibits better stability at high temperatures, reduced processing shrinkage and improved crush and abrasion resistance.

Thus, a heretofore unaddressed need exists in the industry to address the aforementioned deficiencies and inadequacies.

SUMMARY OF THE INVENTION

The foregoing problems have been overcome by a outside plant communication cable including either a core tube or buffer tubes with the optical fibers disposed therein, and a jacket surrounding the core tube or buffer tubes, made of a resin that is an impact-modified polypropylene-ethylene copolymer compounded with one or more additives that prevent or limit degradation resulting from exposure to ultraviolet radiation. The resin of the present invention has a glass transition temperature of less than −4° C., exhibits lower post-extrusion shrinkage than high density polyethylene, has a melting temperature 30–40° C. higher than polyethylene, has a higher crush and abrasion resistance than polyethylene, and has a range of moduli of 120 to 300 ksi.

There are many possible examples of the type of base resins that may be incorporated into the jacket. Further, the jacket may incorporate antioxidants, nucleating agents, ultraviolet light absorbers, quenchers, light stabilizers, fillers, and coupling agents into the resin.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWING

The invention can be better understood with reference to the following drawing. The components in the drawing are not necessarily to scale, emphasis instead being placed upon clearly illustrating the principles of the present invention.

DETAILED DESCRIPTION OF THE INVENTION

Figure 1:
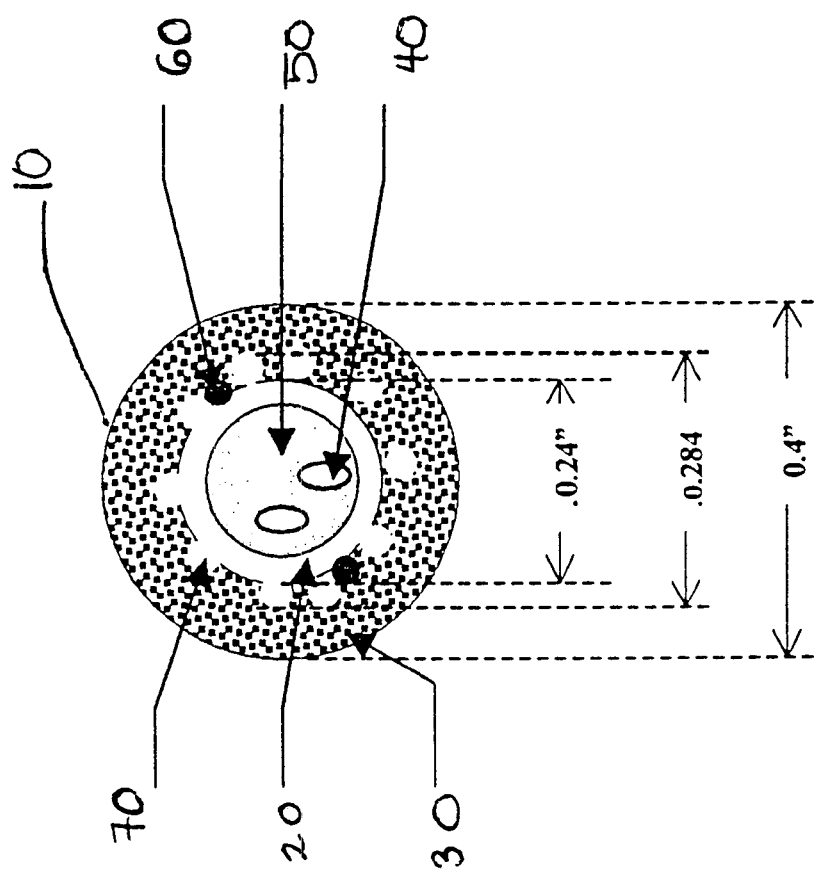
FIG. 1 is a cross-sectional end view of a central-core cable design.

FIG. 1 discloses a central-core cable 10 having a core tube 20 disposed within an outer jacket 30 which is made of a resin. Disposed within core tube 20 are transmission media 40 and, optionally, a filling compound 50. Alternatively, but not pictured, the cable may include instead of a central core tube, a plurality of buffer tubes with the transmission media disposed therein. A rip cord 60, for example Kevlar® yarn, facilitates removal of the outer jacket 30. Additionally, strength members 70 are disclosed here as ten glass rovings, 0.022 inches×0.054 inches. The purpose of the strength members 70 is to provide tensile stiffness when an axial load is applied to the cable 10 and to keep this load from being transmitted to the transmission media 40 within the central core 20.

Desirably, the strength members 70 possess negligible compressive stiffness as these components are very flexible and can be as much as 70% less in cost than rigid dielectric strength members, such as epoxy-glass rods, which have significant compressive as well as tensile stiffness. The strength members 70 may be impregnated glass rovings; however, other materials, metallic or non-metallic, such as glass or Kevlar® yarn can be used. Also, the strength members 70 can be composite structures. These strength members can be an integral part of the jacket 30 and function together as a unit.

The specific design of these strength members and the complete sheath system are not critical to the novel aspects of the present invention. However, for the sake of completeness, various forms of acceptable sheath designs and constructions are provided in the following commonly assigned U.S. Pat. No. 4,078,853 to Kempf et al.; U.S. Pat. No. 4,826,278 to Gartside, et al.; U.S. Pat. No. 4,844,575 to Kinard. et al.; U.S. Pat. No. 5,082.348 to Gartside et al.; and U.S. Pat. No. 5,109,457 to Panuska et al., all of which are incorporated herein by reference.

As stated above with regard to the complete sheath system, the particular design and construction of the entire sheath is not critical to the implementation of the present invention. Nevertheless, one acceptable jacket design is an outer jacket 30 that includes a resin. Additionally, the outer jacket 30 may include high aspect ratio fillers, a coupling agent to aid adhesion between the fillers and the resin, to aid in dispersion of the filler, and to improve processibility. Examples of various types of fillers and coupling agents are disclosed in U.S. patent application, Ser. No. 09/481,186, filed on Jan. 12, 2000 by Dixon, et al., which is incorporated herein by reference.

The base resin of the present invention is an impact-modified copolymer of polypropylene and ethylene that has been compounded with one or more UV stabilizers. "Impact modification" is quantified according to ASTM D 746 procedure, which measures a "brittleness temperature." In this procedure, ten samples are chilled, then impacted with a swinging pendulum. The "brittleness temperature" is the temperature at which fifty percent of the samples fail when impacted. Unmodified polypropylene has a "brittleness temperature" of greater than or equal to 0° C.

Embodiments of the present invention, however, using an impact-modified polypropylene, would have a "brittleness temperature" of no greater than −5° C. The lowering of the "glass transition temperature", i.e., the temperature at which the material will become brittle and shatter when violently impacted, is proportional to the amount of copolymerization with ethylene. Examples of commercial based resins that are suitable for embodiments of the present invention include, but are not limited to the following: Acctuf 3045, or 3243, Polypropylene Impact Polymers™ from BP Amoco p.l.c. in Alpharetta, Ga.; Escorene PP7031 E7™, or Escorene PP7822NE7™, from ExxonMobil Chemical Corporation in Baytown, Tex.; and DC-113 Polypropylene™ from The Dow Chemical Company in Freeport, Tex. Some of these commercially available resins, such as the Exxon PP7822-NE7™, include nucleating agents to increase the modulus of the material. In addition, these resins also contain antioxidants to limit oxidative degradation during processing as well as during the lifetime of the cable. An example of a suitable antioxidant is Irganox™ 1010, available from Ciba Specialty Chemicals Holding Incorporated, Tarrytown, N.Y.

In order to be acceptable for outside plant applications, the jacket should be capable of weathering well in outdoor environments. Therefore according to embodiments of the present invention, the impact-modified polypropylene resin may be compounded with UV stabilizers. This class of materials includes but is not limited to: ultraviolet absorbers, quenchers, and hindered amine light stabilizers. Ultraviolet absorbers, including hydroxybenzotriazoles, hydroxybenzophenones, and carbon black, stabilize resins through absorption of incident radiation and subsequent release of this energy as heat. Commercially available examples of the hydroxybenzotriazole type of UV absorber include Tinuvin™ 328, available from Ciba Specialty Chemicals, and LA-36™, available from Amfine Chemical Corporation, Allendale, N.J. A commercially available example of the hydroxybenzophenone type of UV absorber is Chimassorb™ 81, available from Ciba Specialty Chemicals. Several suitable carbon blacks are available from Cabot Corporation, Boston, Mass., including N110™ carbon black. Quenchers stabilize resins by relieving excess energy from portions of the polymer that have absorbed UV radiation, subsequently releasing the excess energy as heat. A commercially available example of a quencher is Cyasorb™ UV-1084, available from Cytec Industries Incorporated, Stamford, Conn.

Although the mechanism of action of hindered amine light stabilizers (HALS) is not completely understood, their effectiveness at improving the weatherability of polymers is well-documented. For recent discussions of HALS in the literature, see F. Gugmus, *Polymer Degradation and Stability* v. 40, pp. 167–215 (1993); P. Solera and G. Capocci, *Polymers & Polymer Composites*, v. 7, pp. 521–536 (1999); and I. Vulic, J. M. Eng, S.-B. Samuels, and A. H. Wagner, *Polymers & Polymer Composites*, v. 7, pp. 565–573 (1999). Many potentially suitable HALS are commercially available. Examples include Tinuvin™ 770, Chimassorb™ 944, and Chimassorb™ 2020, all available from Ciba Specialty Chemicals; Cyasorb™ UV-3853, Cyasorb™ UV-3346, and Cyasorb™ UV-3529, all available from Cytec Industries Inc.; and LA-62™, LA-63™, and LA-67™, all available from Amfine Chemical Corporation. As discussed by Solera and Capocci, optimum performance may be achieved through the use of combinations of multiple HALS and UV absorbers, depending upon factors such as jacket thickness and potential for exposure to acidic compounds during service.

Cables jacketed with a resin of impact-modified polypropylene copolymers provide several advantages. First, they are at least twenty percent less costly than traditional polyethylene jacket resins. Second, during processing, a polypropylene copolymer will shrink much less than a polyethylene resin with an identical elastic modulus. Third, the polypropylene copolymers have melting temperatures 30–40° C. higher than polyethylene, and therefore exhibit greater stability at higher temperatures.

Fourth, impact-modified polypropylene copolymers have a lower coefficient of friction than the medium-density or high-density polyethylene resins presently used for cable jacketing. Minimization of friction makes it easier to install cables in buried ducts, one of the most common cable installation environments. Table 1 below shows the coefficient of friction for several polyethylene and impact-modified polypropylene materials, measured following the ASTM D 1894 procedure. In all cases, the static and dynamic coefficients of friction of each material were measured against a high-density polyethylene surface. HDPE is a common material of construction for underground cable ducts.

TABLE 1

Static and Dynamic Coefficients of Friction of Cable Jacketing Materials Against a High-Density Polyethylene Surface. Tests Followed the ASTM D 1894 standard.

| Material | Static Coefficient of Friction with High Density Polyethylene (HDPE) | Dynamic Coefficient of Friction with High Density Polyethylene (HDPE) |
| --- | --- | --- |
| Union Carbide DGDA-8479 HDPE | 0.466 | 0.391 |
| Union Carbide DHDA-8864 Medium Density Polyethylene (MDPE) | 0.577 | 0.489 |
| BP Amoco 3240 Impact-Modified Polyproplyene (PP) | 0.371 | 0.302 |
| Dow DC-113 Impact-Modified PP | 0.340 | 0.302 |

Fifth, some grades of impact-modified polypropylene (PP) are available with moduli higher than 200 ksi, as compared to 75–150 ksi for polyethylene (PE). Data for elastic moduli for several impact-modified polypropylene resins, as well as commercially available jacketing polyethylenes, are shown in Table 2 below. All measurements were made following the ASTM D 638 test procedure. The higher modulus of impact-modified polypropylene results in increased crush and abrasion resistance. Acceptable moduli for PP jacketing materials ranges from 120 ksi to 300 ksi. Optimal moduli are dependent on how much post-extrusion shrinkage can be tolerated in given cable design. As stated previously, an impact-modified polypropylene offers lower post-extrusion shrinkage than a polyethylene with the same crush resistance and, by inference and experimental data, with a modulus of the same magnitude. Alternately, for the case of resins with identical post-extrusion shrinkage, an impact-modified polypropylene resin will have greater crush resistance than a polyethylene resin.

TABLE 2

Elastic Modulus of Cable Jacketing Materials. Tests followed the ASTM D 638 standard.

| Material | Elastic Modulus, psi |
| --- | --- |
| Union Carbide 8479 HDPE | 108,700 |
| Union Carbide 8864 MDPE | 60,200 |
| ExxonMobil 7822NE7 Impact-Modified PP | 205,300 |
| BP Amoco 3045 Impact-Modified PP | 154,400 |
| BP Amoco 3240 Impact-Modified PP | 206,000 |
| Dow DC-113 Impact-Modified PP | 133,900 |

It should be emphasized that the above-described embodiments of the present invention, particularly any "preferred" embodiments, are merely possible examples of implementations, and are merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. An outside plant fiber optic cable comprising
a core tube having transmission media disposed therein; and
an outer jacket for the cable disposed around the core tube, wherein the jacket includes
a resin that includes an impact-modified polypropylene-ethylene copolymer compounded with ultraviolet light stabilizers.

2. The cable of claim 1, wherein the ultraviolet light stabilizers are selected from the group consisting of: carbon black and hindered amine light stabilizers.

3. The cable of claim 1, wherein the resin has a glass transition temperature of less than −4° C.

4. The cable of claim 1, wherein the resin exhibits lower post-extrusion shrinkage than high density polyethylene.

5. The cable of claim 1, wherein the resin has a melting temperature 30–40° C. higher than polyethylene.

6. The cable of claim 1, wherein the resin has higher crush and abrasion resistance than a polyethylene with equivalent post-extrusion shrinkage.

7. The cable of claim 1, wherein the resins have a range of moduli from 120–300 ksi.

8. An outside plant fiber optic cable comprising:
a core tube having transmission media disposed therein; and
an outer jacket for the cable disposed around the core tube, wherein the jacket includes
a resin that includes an impact-modified polypropylene-ethylene copolymer compounded with ultraviolet light stabilizers;
antioxidants;
nucleating agents;
ultraviolet light absorbers;
ultraviolet light quenchers;
light stabilizers;
fillers; and
coupling agents to aid in adhesion between the fillers and the resin, to aid in dispersion of the filler, and to improve processability.

9. The cable of claim 8 wherein the antioxidant is Irganox™ 1010.

10. The cable of claim 8, wherein the ultraviolet light absorber is selected from the group consisting of: hydroxybenzotriazoles, hydroxybenzophenones, and carbon black.

11. The cable of claim 10 wherein the hydroxybenzotriazole is Tinuvin™.

12. The cable of claim 11 wherein the hydroxybenzotriazole is LA-36™.

13. The cable of claim 8 wherein the light stabilizer is a hindered amine light stabilizer.

14. The cable of claim 13 wherein the hindered amine light stabilizer is selected from the group consisting of: Tinuvin™ 770, Chimassorb™ 944, Chimassorb™ 2020, Cyasorb™ UV-3853, Cyasorb™ UV3346, Cyasorb™ UV-3529, LA-62 ™ and LA-63™.

15. The cable of claim 8, wherein the filler is a high aspect ratio filler.

16. An outside plant fiber optic cable comprising
- a plurality of buffer tubes having transmission media disposed therein; and
- an outer jacket for the cable disposed around the buffer tubes, wherein the jacket includes
  - a resin that includes an impact-modified polypropylene-ethylene copolymer compounded with UV stabilizers.

17. An outside plant fiber optic cable comprising:
- a plurality of buffer tubes having transmission media disposed therein; and
- an outer jacket for the cable disposed around the buffer tubes, wherein the jacket includes
  - a resin that includes an impact-modified polypropylene-ethylene copolymer compounded with UV stabilizers;
  - antioxidants;
  - nucleating agents;
  - ultraviolet light absorbers;
  - ultraviolet light quenchers;
  - light stabilizers;
  - fillers; and
  - coupling agents to aid in adhesion between the fillers and the resin, to aid in dispersion of the filler, and to improve processability.

\* \* \* \* \*